No. 853,207. PATENTED MAY 7, 1907.
J. A. MYERS.
CAR DOOR HANGER.
APPLICATION FILED OCT. 23, 1906.

ATTEST.
H. J. Fletcher.
M. P. Smith

INVENTOR.
JACOB A. MYERS.
BY Higdon & Longan
ATTY'S.

THE NORRIS PETERS CO., WASHINGTON, D. C.

UNITED STATES PATENT OFFICE.

JACOB A. MYERS, OF GREENVILLE, ILLINOIS.

CAR-DOOR HANGER.

No. 853,207.   Specification of Letters Patent.   Patented May 7, 1907.

Application filed October 23, 1906. Serial No. 340,217.

*To all whom it may concern:*

Be it known that I, JACOB A. MYERS, a citizen of the United States, and a resident of Greenville, Bond county, Illinois, have invented certain new and useful Improvements in Car-Door Hangers, of which the following is a specification containing a full, clear, and exact description, reference being had to the accompanying drawings, forming a part hereof.

My invention relates to an improvement in car door hangers and consists in certain novel features of construction and arrangement of parts, which will be hereinafter more fully set forth, pointed out in the claims, and illustrated in the accompanying drawings, in which:—

Figure 1:
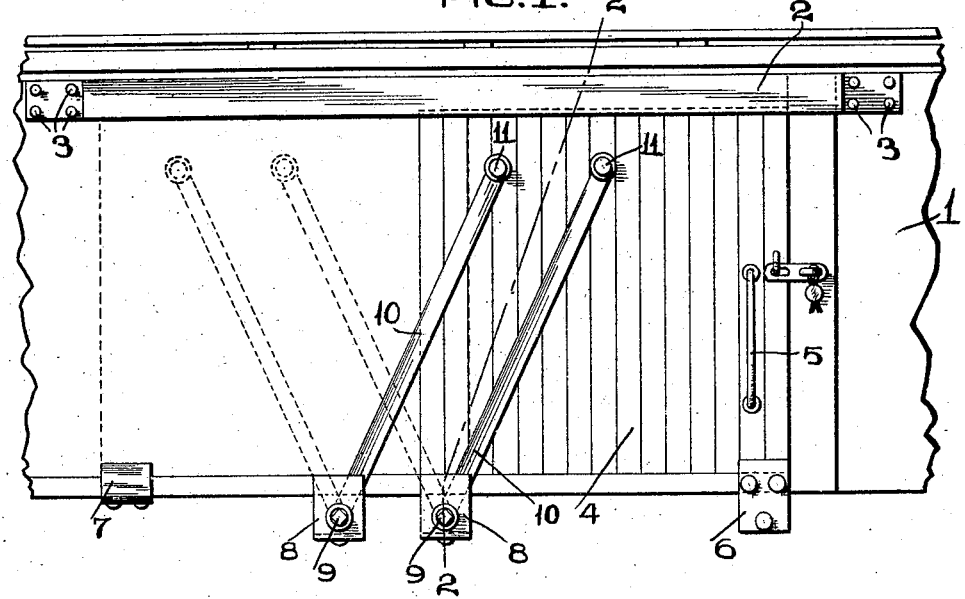
Figures 2, 3:
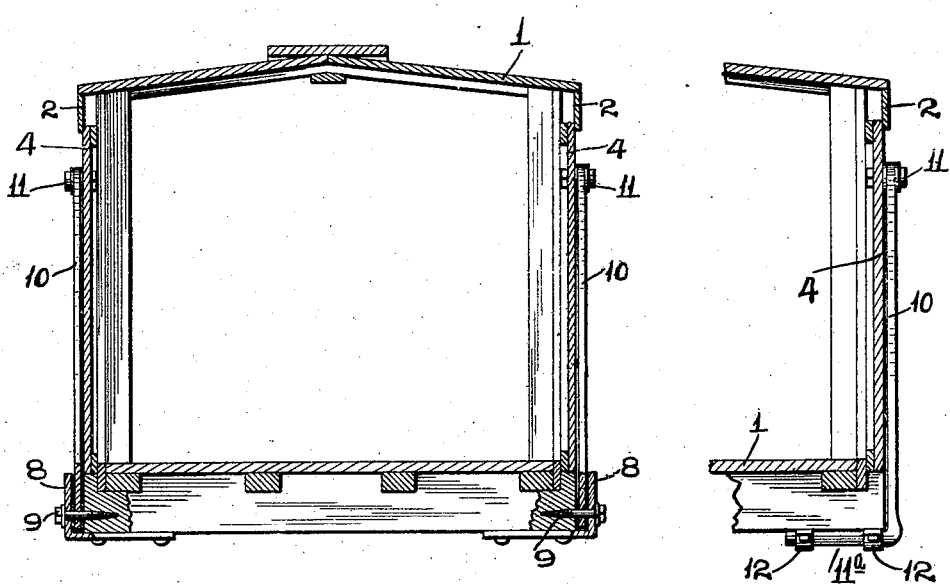

Figure 1 is a side elevation of my invention applied to the car, a portion of the car being broken away; Fig. 2 is a transverse section taken on the line 2—2 of Fig. 1; Fig. 3 is a sectional view, with parts broken away, of a modified form of my invention.

Referring by numerals to the accompanying drawings;—1 indicates a car of the ordinary construction. Secured underneath the eaves of the roof of said car, and spanning the car door opening is a housing 2, the ends of said housing being secured to the car by means of bolts, rivets, or nails 3. Said housing is made of metal.

4 indicates the usual car door, with the operating handle 5.

Secured to the car, or the framework thereof is an L-shaped bracket 6. Said L-shaped bracket 6 answers as a support to the car door when it is closed to prevent the same from being thrust outwardly.

7 indicates a similar L-shaped bracket, which is secured to the car or the framework thereof, and answers as a receiving bracket or support for the car door when it is open.

Secured to the framework of the car are two additional L-shaped brackets 8, which are secured to the framework of the car by means of the screw bolts 9.

The top edge of the door is located beneath the housing 2, said housing forming a pocket for the reception of the top edge of the car door when it is closed, or when it is open.

10 indicates two parallel bars, the lower ends of which are pivoted between the upwardly projecting arms of the brackets 8 and the framework of the car, and they are pivoted on the screw bolts 9, the vertical arms of said brackets 8 acting as a keeper for the bars 10. The upper ends of said bars 10 are pivoted to the car door by means of bolts 11. These bars 10 are of such a required length and are so pivoted to the car door 4 that they will permit said door to be fully closed; and, when the car door is being opened, they will receive the full weight of same and permit it to be opened as if it were on a pivotal bearing.

When the car door is closed, these parallel bars 10 are disposed transversely over about one-half the portion of the car door, thereby strengthening the same and acting as a brace against the outward thrust.

In Fig. 3 a construction is shown wherein; the bars 10 provided with arms 11$^a$, which are secured underneath the framework of the car by means of brackets 12.

Having fully described my invention, what I claim is:

1. The combination with a car and a car door, of two parallel bars, the upper ends of which are pivoted to the car door, and the lower ends thereof pivotally connected at fixed points to the car; substantially as specified.

2. The combination with a car and car door, of a pair of parallel bars pivotally secured at their upper ends to the car door, the lower ends of which bars are pivotally secured at fixed points to the car body below the door.

In testimony whereof, I have signed my name to this specification, in presence of two subscribing witnesses.

JACOB A. MYERS.

Witnesses:
M. P. SMITH,
E. L. WALLACE.